April 2, 1957 M. E. MITCHELL 2,787,343
APPARATUS FOR SERVICING OVERHEAD EQUIPMENT
Filed Aug. 29, 1951 9 Sheets-Sheet 2
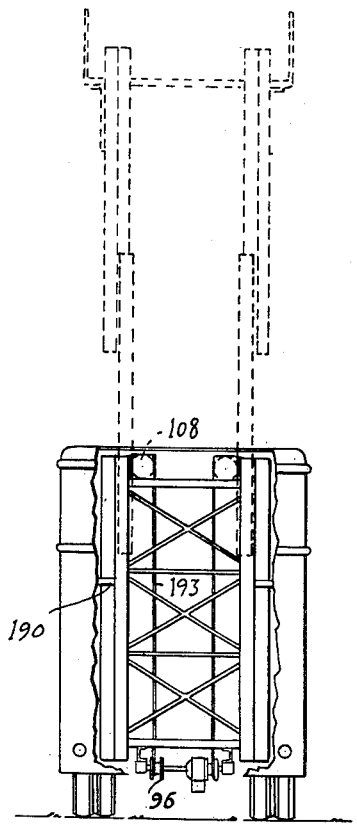
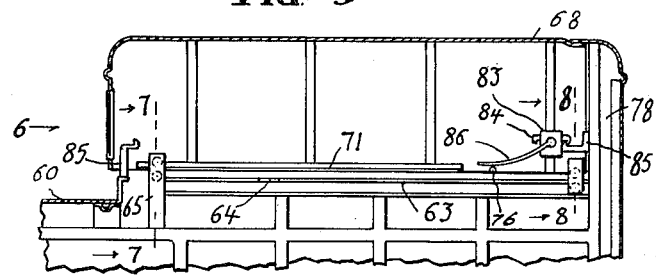
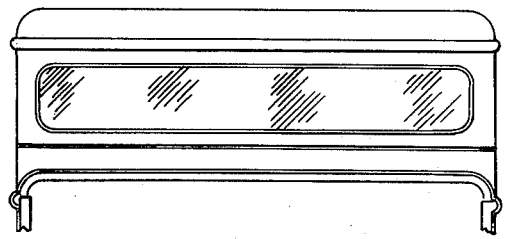
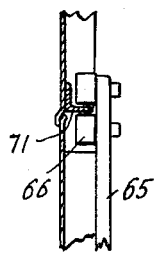
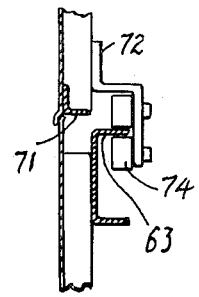
INVENTOR
MAURICE E. MITCHELL
ATTORNEY

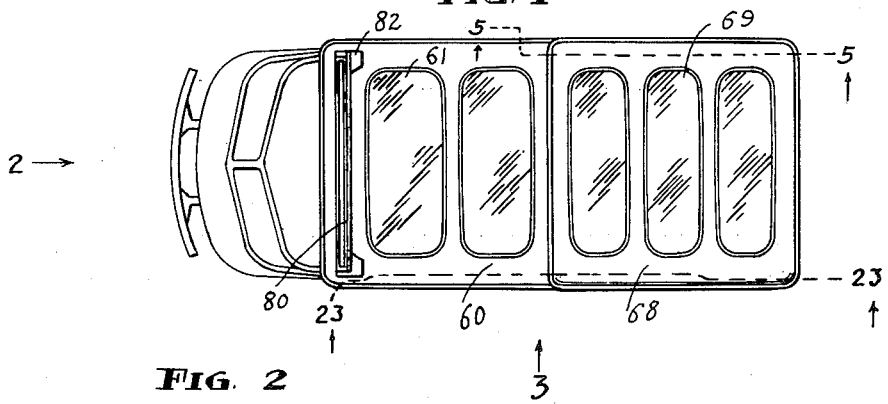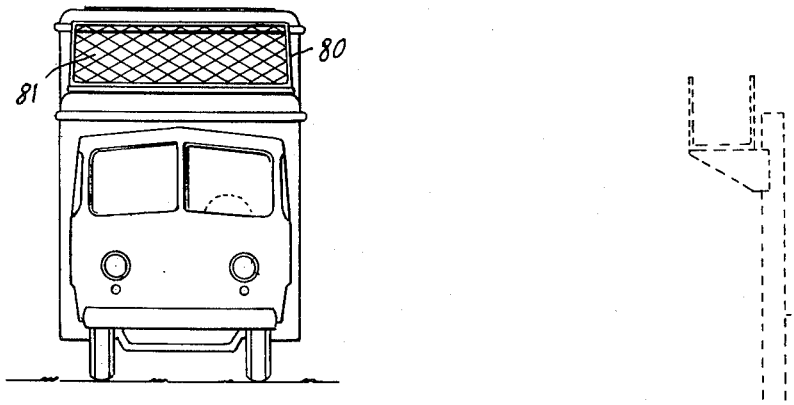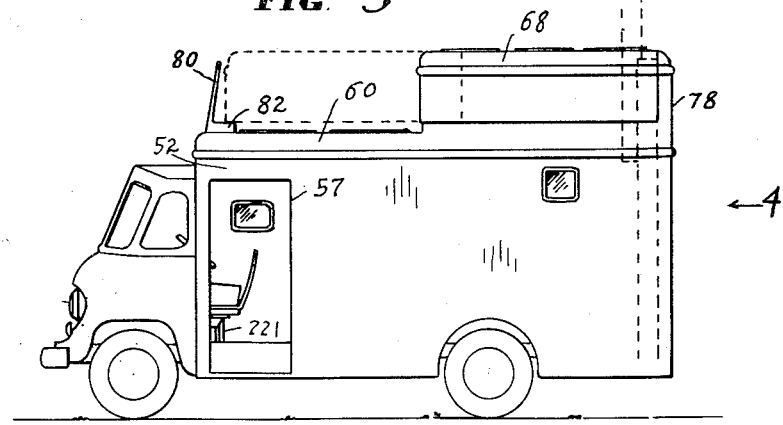

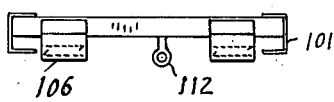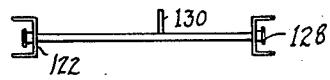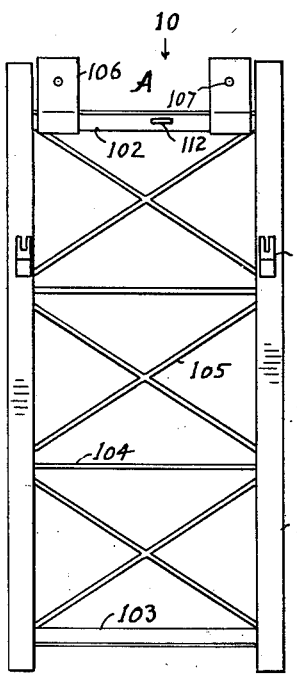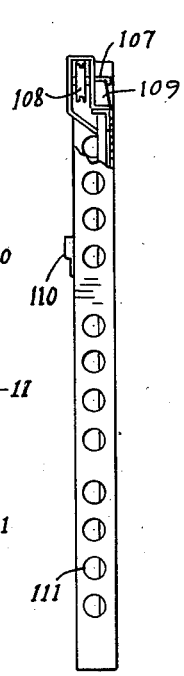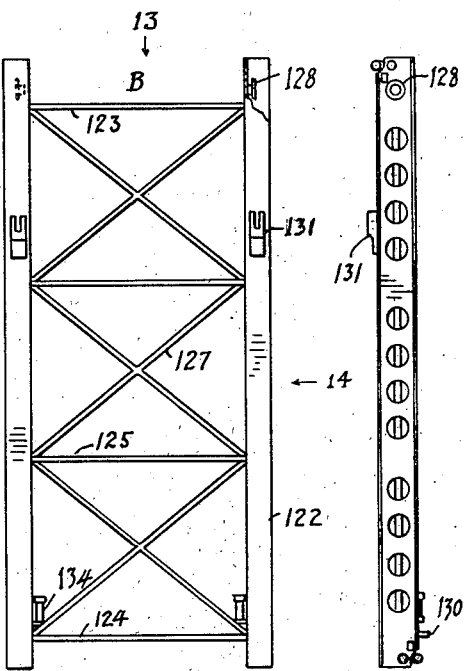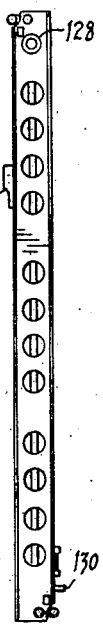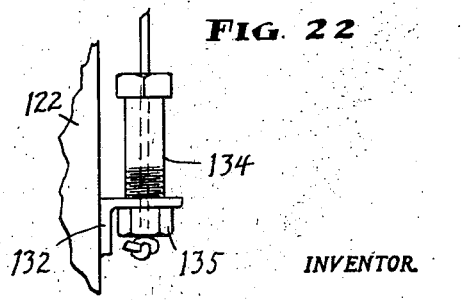

April 2, 1957     M. E. MITCHELL     2,787,343
APPARATUS FOR SERVICING OVERHEAD EQUIPMENT
Filed Aug. 29, 1951     9 Sheets-Sheet 4
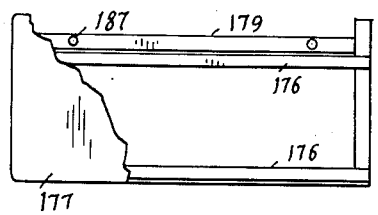
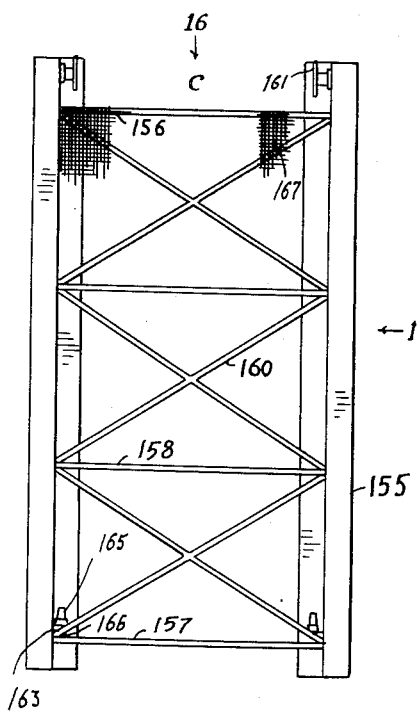
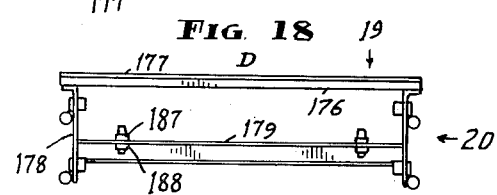
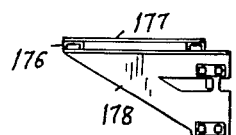
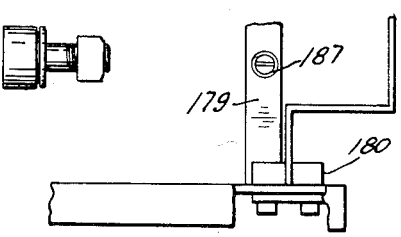
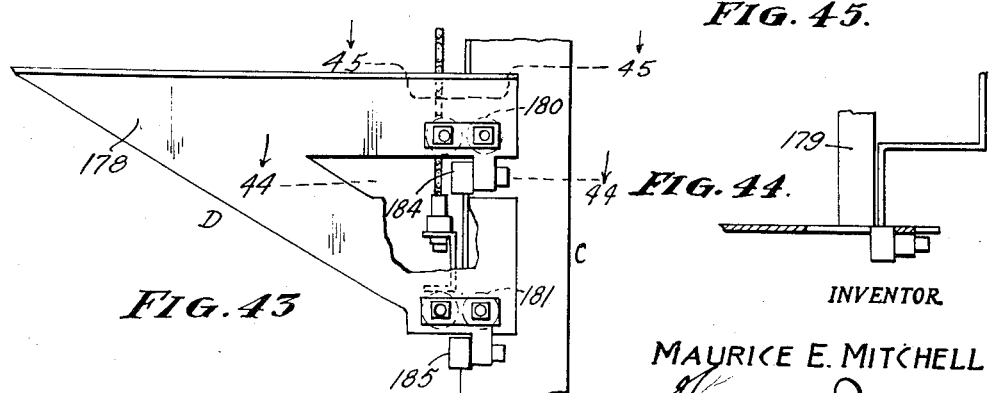
INVENTOR
MAURICE E. MITCHELL
ATTORNEY April 2, 1957     M. E. MITCHELL     2,787,343
APPARATUS FOR SERVICING OVERHEAD EQUIPMENT
Filed Aug. 29, 1951     9 Sheets-Sheet 5
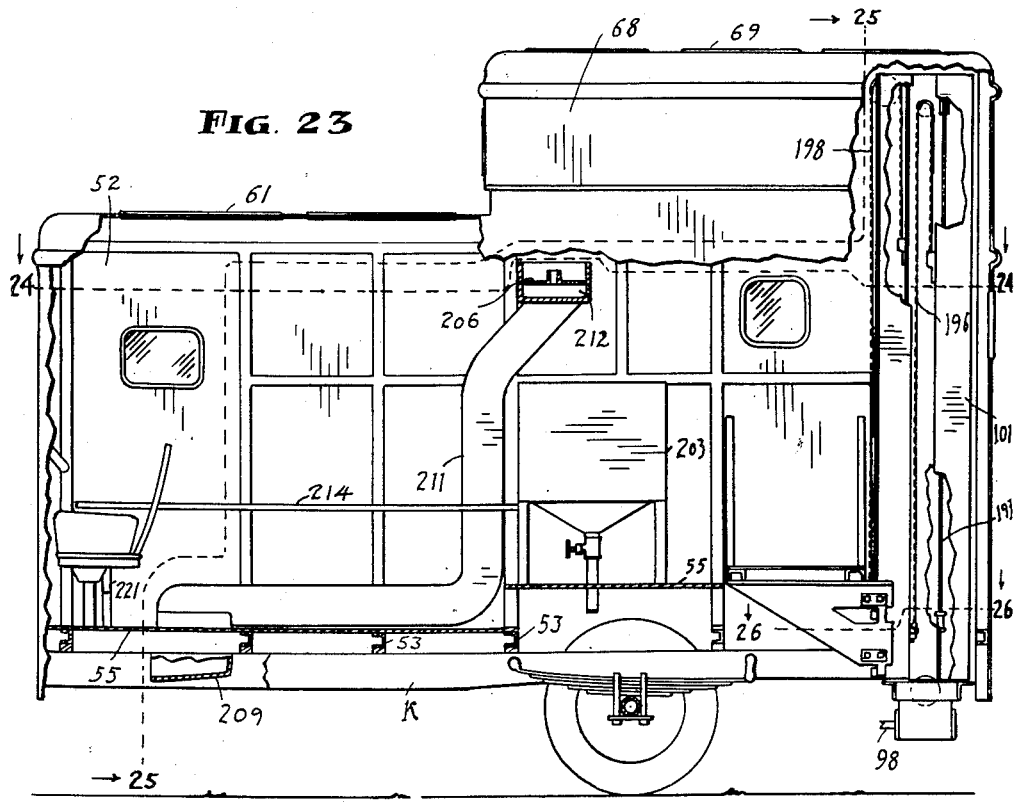
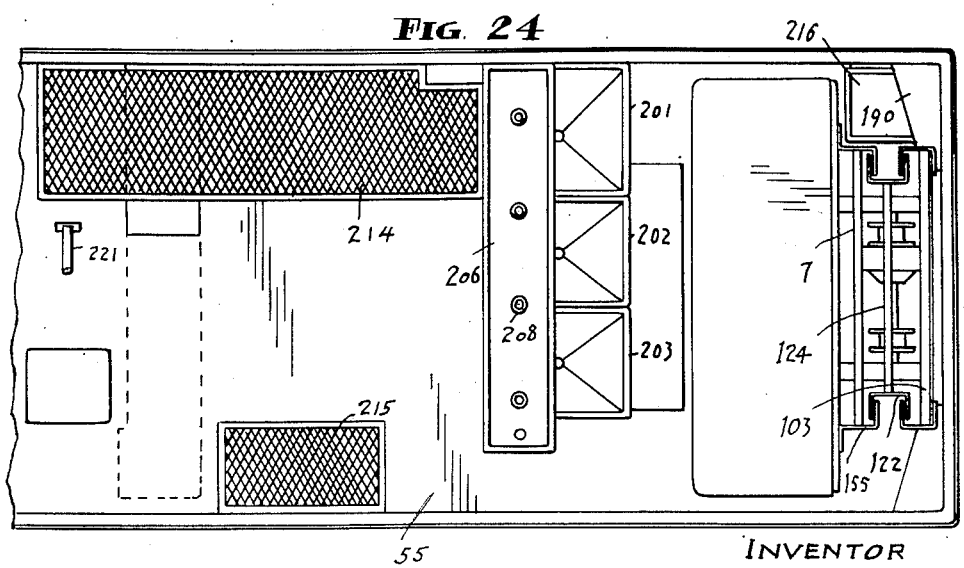
INVENTOR
MAURICE E. MITCHELL
ATTORNEY April 2, 1957 M. E. MITCHELL 2,787,343
APPARATUS FOR SERVICING OVERHEAD EQUIPMENT
Filed Aug. 29, 1951 9 Sheets-Sheet 6

INVENTOR
MAURICE E. MITCHELL
ATTORNEY

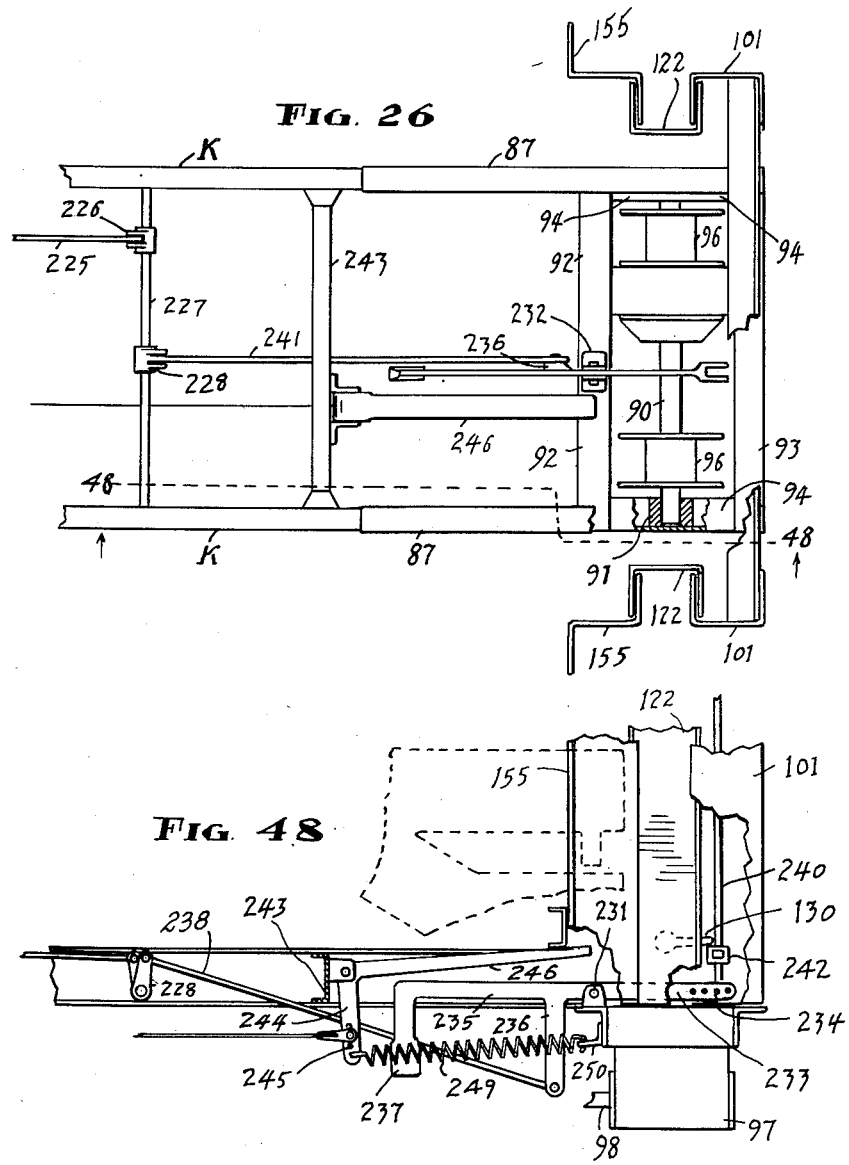

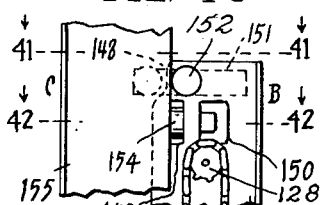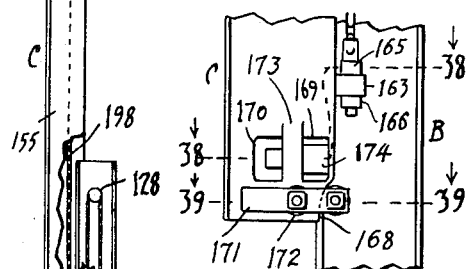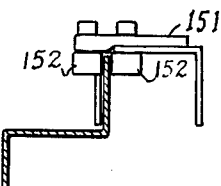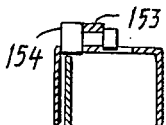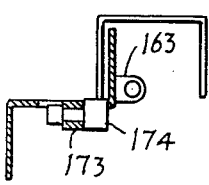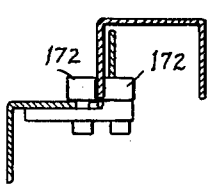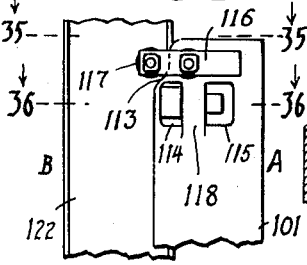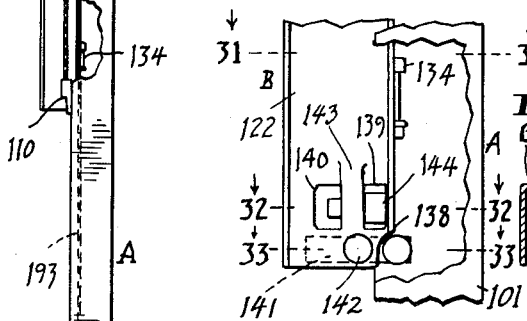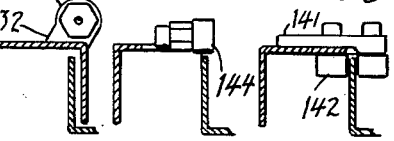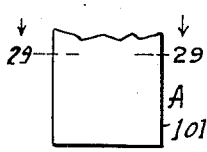

April 2, 1957　　　M. E. MITCHELL　　　2,787,343
APPARATUS FOR SERVICING OVERHEAD EQUIPMENT
Filed Aug. 29, 1951　　　　　　　　　　9 Sheets-Sheet 9
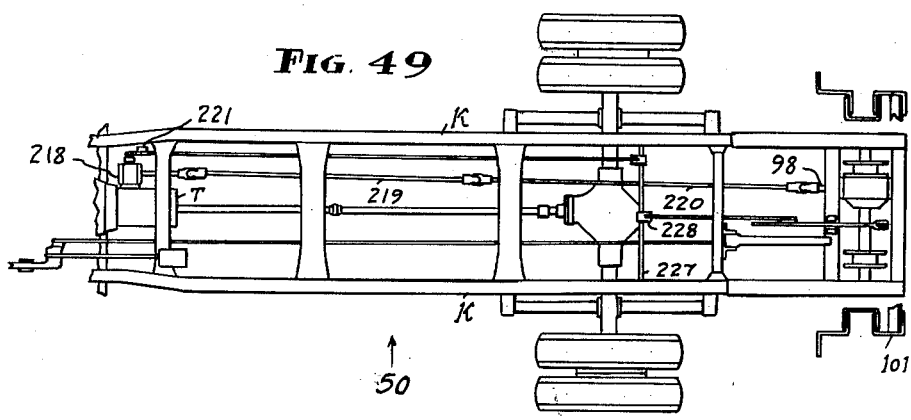
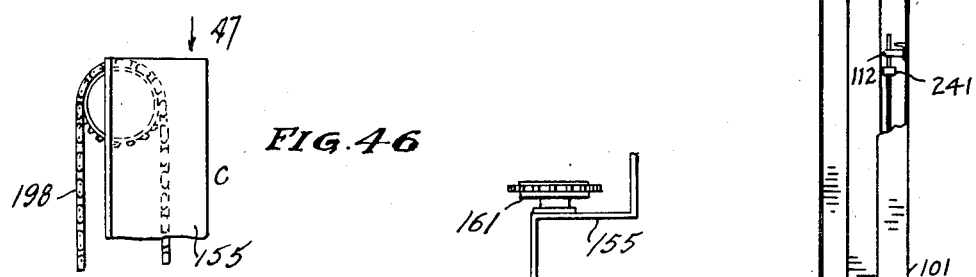
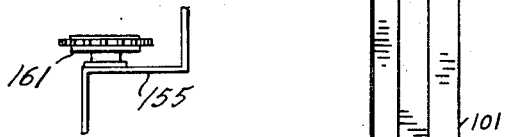
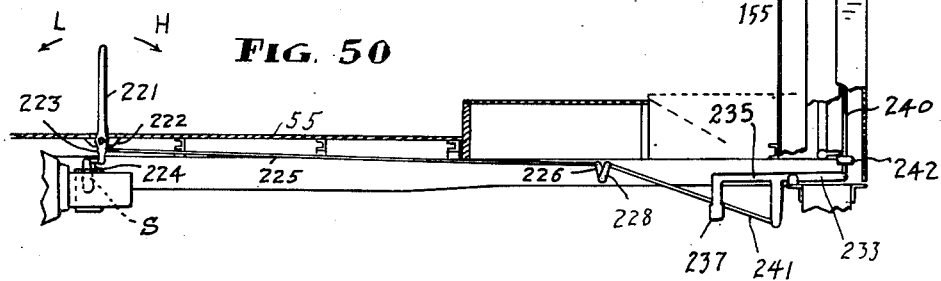
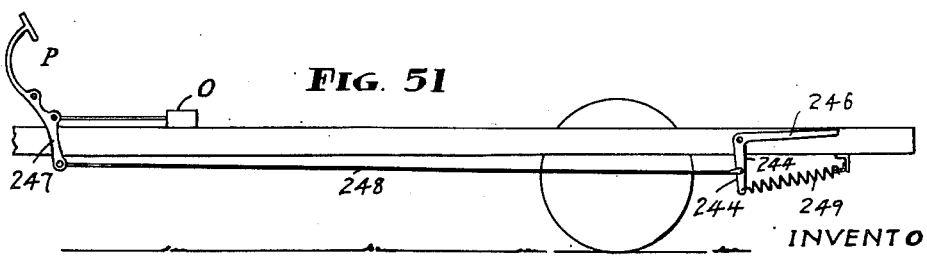
INVENTOR
MAURICE E. MITCHELL
ATTORNEY – # United States Patent Office 2,787,343
Patented Apr. 2, 1957

2,787,343
APPARATUS FOR SERVICING OVERHEAD EQUIPMENT

Maurice E. Mitchell, Muncie, Ind., assignor to Mitchell Maintenance Company, Inc., Muncie, Ind., a corporation of Indiana Application August 29, 1951, Serial No. 244,242

11 Claims. (Cl. 189—11)

This invention relates to apparatus for the servicing or maintenance of overhead equipment, such as street lights and other overhead public utility equipment.

Overhead public utility lines and equipment require various maintenance activities, including inspection, repair, and renewing of fittings, fixtures, conductors, lamps and other parts; servicing of poles, standards, arms, and the like; and washing and replacing of lamp globes, shades, and other glassware. In the past, such maintenance operations have been laborious and inconvenient; have involved service interruptions, and have been excessively expensive.

It is the general object of the present invention to provide apparatus with which these various maintenance and servicing activities can be performed more conveniently and expeditiously, and at less cost.

In accordance with the invention, the service apparatus comprises an automotive truck for transporting materials and workmen from point to point where servicing work is to be performed, for example, from light to light along a series of street lights which are to be serviced, and there is combined with such truck an elevator mounted thereon, as at the rear of the truck bed area and preferably within an enclosing body on the truck, with an elevator platform which lowers to the floor level of the truck and may be elevated directly therefrom to any height desired for service access to overhead equipment, and laundry or other service equipment carried by the truck in a work area adjacent to and accessible from the lowered position of the platform; whereby when the truck is stopped at each location where service work is to be performed, a workman with the tools and materials necessary may be elevated on the platform directly from his position at the floor level of the truck to the overhead location desired, and after the overhead work is completed, lowered to the floor level of the truck in a position of access to the service equipment where, for example, glassware brought down may be promptly cleaned and prepared for use in subsequent operations.

Said general object and also certain specific aims of the invention will more fully appear from the following description and claims.

The accompanying drawings illustrate the invention. In such drawings:

Fig. 1 is a top plan of maintenance apparatus embodying the invention;

Fig. 2 is a front elevation of the maintenance apparatus taken in the direction of arrow 2 of Fig. 1;

Fig. 3 is a side elevation of the maintenance apparatus taken in the direction of arrow 3 of Fig. 1, showing in dotted lines the elevator and the movable top section in their working positions;

Fig. 4 is a rear elevation of the maintenance apparatus with the rear wall being partially broken away to show the cooperating elevator and winch mechanisms;

Fig. 5 is an enlarged longitudinal section taken on the line 5—5 of Fig. 1;

Fig. 6 is a front elevation of the movable roof section taken in the direction of arrow 6 of Fig. 5;

Fig. 7 is a vertical section of the roof-sliding mechanism taken on the line 7—7 of Fig. 5;

Fig. 8 is a vertical section of the roof-sliding mechanism taken on the line 8—8 of Fig. 5;

Fig. 9 is a front elevation of the bottom elevator section;

Fig. 10 is a top plan of the bottom elevator section taken in the direction of arrow 10 of Fig. 9;

Fig. 11 is a side elevation of the bottom elevator section taken in the direction of arrow 11 of Fig. 9;

Fig. 12 is a front elevation of the second section of the elevator assembly;

Fig. 13 is a top plan of the second elevator section taken in the direction of arrow 13 of Fig. 12;

Fig. 14 is a side elevation taken in the direction of arrow 14 of Fig. 12;

Fig. 15 is a front elevation of the third section of the elevator assembly;

Fig. 16 is a top plan of the third elevator section taken in the direction of arrow 16 of Fig. 15;

Fig. 17 is a side elevation taken in the direction of arrow 17 of Fig. 15;

Fig. 18 is a front elevation of the fourth section of the elevator assembly;

Fig. 19 is a top plan taken in the direction of arrow 19 of Fig. 18;

Fig. 20 is a side elevation taken in the direction of arrow 20 of Fig. 18;

Fig. 21 is a side elevation of a roller upon which the various elevator sections slide one upon the other;

Fig. 22 is a detailed view of a lift-cable hitch secured at the lower portion of each elevator lift-section;

Fig. 23 is an enlarged sectional view taken on the line 23—23 of Fig. 1;

Fig. 24 is a top sectional view taken on the line 24—24 of Fig. 23;

Fig. 26 is a top sectional view taken on the line 26—26 of Fig. 23;

Fig. 27 is a side elevation of the elevator assembly in an extended position;

Fig. 28 is a fragmentary side view of one of the legs of the first elevator section;

Fig. 29 is a cross-section taken on the line 29—29 of Fig. 28;

Fig. 30 is a detailed side elevation of the juncture between the first and second elevator sections;

Fig. 31 is a fragmentary cross-section taken on the line 31—31 of Fig. 30;

Fig. 32 is a fragmentary cross-section taken on the line 32—32 of Fig. 30;

Fig. 33 is a fragmentary cross-section taken on the line 33—33 of Fig. 30;

Fig. 34 is a detailed side elevation of the juncture between the top portion of the first elevator section and an intermediate portion of the second section;

Fig. 35 is a cross-section taken on the line 35—35 of Fig. 34;

Fig. 36 is a cross-section taken on the line 36—36 of Fig. 34;

Fig. 37 is a detailed side elevation of the juncture between an intermediate portion of the second elevator section and the bottom portion of the third section;

Fig. 38 is a cross-section taken on the line 38—38 of Fig. 37;

Fig. 39 is a cross-section taken on the line 39—39 of Fig. 37;

Fig. 40 is a detailed side elevation of the juncture between the top portion of the second elevator section and an intermediate portion of the third section;

Fig. 41 is a cross-section taken on the line 41—41 of Fig. 40;

Fig. 42 is a cross-section taken on the line 42—42 of Fig. 40;

Fig. 43 is a detailed side elevation of the juncture between the third and fourth elevator sections;

Fig. 44 is a sectional view taken on the line 44—44 of Fig. 43;

Fig. 45 is a sectional view taken on the line 45—45 of Fig. 43;

Fig. 46 is a side elevation of the top portion of the third elevator section;

Fig. 47 is a top plan of the third elevator section taken in the direction of arrow 47 of Fig. 46;

Fig. 48 is a longitudinal section taken on the line 48—48 of Fig. 26;

Fig. 49 is a top plan showing the power connections for the elevator assembly;

Fig. 50 is a side elevation taken in the direction of arrow 50 of Fig. 49; and

Fig. 51 is a side elevation of the braking mechanism for the truck.

Figure 25:
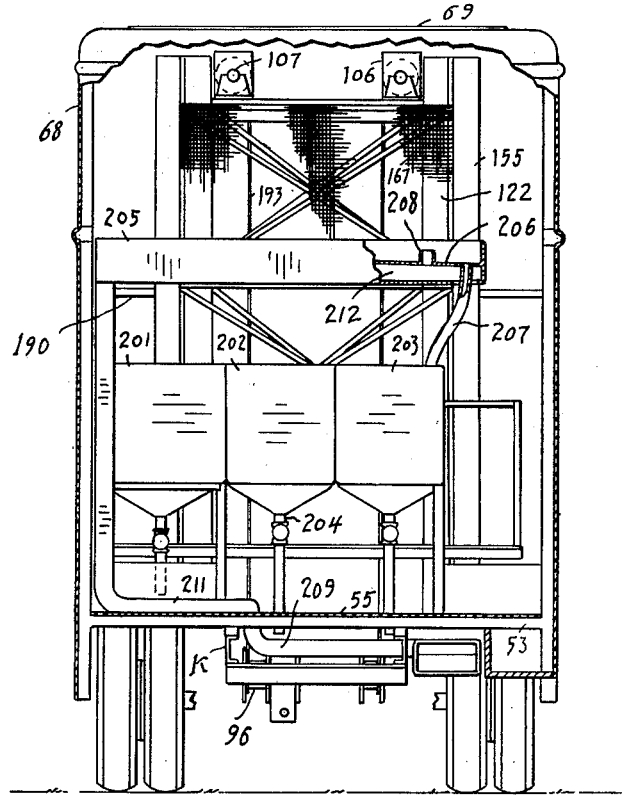
Fig. 25 is a vertical section taken on the line 25—25 of Fig. 23.

The maintenance apparatus shown in the drawings utilizes an automotive truck of conventional design. The frontal portion 52 forms a cab housing the truck driver in a position above the engine. The forward portion of the truck body is of a conventional height, and has a suitable roof structure 60 fitted with panes of transparent safety glass 61. The cab communicates with, and forms a part of, the general interior of the truck body allowing the driver access to any part of the truck interior without going outside. As shown in Fig. 23, the lower portion of the side walls of the body are secured to cross beams 53, which are secured to the top of the longitudinal chassis beams K. Conveniently, the left-hand side wall of the truck is provided with a door 57, through which personnel may enter and exit said truck. Suitable openings are provided in each truck side wall for lighting and ventilating the truck interior.

As shown in Fig. 5, the rearward portion of the truck body is of an increased height to accommodate an extensible elevator assembly. Said rearward portion of the body is surmounted by a shiftable roof structure 68 fitted with transparent panes of safety glass 69.

To move the roof structure into a position to allow the elevator to be raised, there is provided a pair of longitudinal rails having horizontal tongues 63 and notches 64; each rail being secured to the upper edge of the inner face of each side wall 52. The axles of rollers 66 are secured, one above the other, to an upwardly directed bracket 65 fastened to each of said side walls above the plane of the rail tongues 63. A pair of longitudinal rails having horizontal tongues 71 is disposed along the lower edge of the inner face of each lateral side wall of the shiftable roof structure 68. The axles of a pair of rollers 74 are secured, one above the other, to a downwardly directed bracket 72 secured to the lower portion of each roof structure side wall below the plane of the rail tongues 71. The rollers 74 are engaged by the tongues 63 of the lower rails and the rollers 66 are engaged by the tongues 71 of the upper rails.

The shiftable roof structure is movable into an open working position by means of a reach-rod 76 extending transversely between the lateral side walls of the roof structure 68. When the rollers 74 are in alignment with the notches 64 of the rail tongues 63, the rearward portion of the roof is lifted raising said rollers above the rails 63. The roof is then rolled forwardly by means of the rod 76 with the rollers 66 and 74 moving along the rail tongues 71 and 63 respectively.

The rear wall of the truck body is provided with a parapet 78 against which the shiftable roof structure abuts when it is in a closed position. An upstanding frame 80 covered with an open-work fabric of expanded metal 81 is secured at a forward position on the top of the truck body. This structure while permitting the passage of light constitutes a protective shield for the frontal glassed-in portion of the shiftable roof structure. The shoulders 82 on said frame further serve to limit the extent of forward movement of the roof structure 68.

As shown in Fig. 5, the roof structure 68 is desirably equipped with a latch fixture 83 secured to the inner face of a side wall of said structure. Said latch is provided with a bolt 84 engageable by a lug 85, which is secured to the body frame. The latch 83 is manually operable, as by a handle bar 86, to lock the shiftable roof structure in a closed position against the parapet 78.

A pair of channel bars 87, shown in Figs. 26 and 49, are secured to the rear portion of the chassis beams K, forming the rearward portion of the truck frame for supporting the elevator lifting mechanism. A pair of cross bars 92 and 93 extending between the channel bars 87 and 94 respectively provide a frame which is secured to the underside of the rear end of the chassis. Said frame structure forms a support for a pair of housings 91 in which is journaled a drive shaft 90 for an elevator-lifting winch mechanism. A pair of drums 96 secured to the shaft 90 are driven by means of a drive shaft 98 communicating power to said drums through a gear box 97 positioned on the shaft 90.

An elevator assembly disposed rearwardly within the truck adjacent its bed area is comprised of elongated upright sections which are positioned in a face to face relationship such that they are vertically slidable one upon the other. The first section A of the elevator is comprised of a pair of metal side members 101 having a U-shaped cross-section. The side members 101 are held in a spaced relationship with their webs in parallelism by means of an upper strut 102, a bottom strut 103, intermediate struts 104, and diagonal ties 105. The upper and lower struts are desirably of angle-bar construction, while the intermediate struts and diagonal ties are made of sections of iron pipe. All of the struts and supporting rods are secured at their junctions, and to the side members 101, as by welding.

A pair of housings 106 projecting slightly beyond the frontal face of section A are secured to the top of the upper strut 102. The housings 106 are laterally disposed in a spaced relationship above the winch drums 96. An axle 107 in each of the two housings 106 is journaled in a grooved sheave 108 and anchored in said housings on a block 109.

As shown in Figs. 34 and 35, the top of the forward flange and the web adjacent thereto on each of the side members 101 is cut away as at 113; said web being provided with openings 114 and 115. Axles of rollers 117 are journaled in a horizontal ear 116 secured to the exterior face of the web of member 101. Said rollers are secured in parallelism and in a position equidistant from the vertical plane of the cut 113 to engage the rearward outwardly extending flange of member 122 for longitudinally guiding section B as it moves along section A. A vertical ear 118 is integrated with the exterior face of said web in a plane below said ear 116. The axle of a roller 119 is received in the ear 118, while the roller 119 is free to rotate in the opening 114 and laterally guide the lift-section B when it is moved along section A.

As shown in Figs. 12 and 27, a second elevator lift-section B is comprised of side members 122 having a U-shaped cross-section. The side members 122 are secured in a spaced relationship with their webs in parallelism and their flange members directed outwardly from the truck. The side members 122 are spaced at a predetermined distance apart slightly less than the distance between the planes of the inboard edges of the opposed side members 101 of section A. A spaced relationship is maintained between the members 122 by means of an upper strut 123, a bottom strut 124, intermediate struts 125, and diagonal ties 127. Said intermediate struts and ties being comprised of iron pipes, may be secured together at their junctures, and to the side members 122, as by welding.

As shown in Fig. 30, the bottom of the rearward flange and the web adjacent thereto on each of the side members 122 is cut away, as at 138 said webs being provided with laterally spaced openings 139 and 140. The axles of a pair of rollers 142 are secured to a horizontal ear 141 which is integrated with the interior face of said web. Said rollers are positioned in parallelism and equidistant from the vertical plane of the cut 138 to engage the forward inwardly extending flange of member 101 for longitudinally guiding section B as it moves along section A. The axle of a roller 144 is received in an ear 143 allowing the roller 144 to rotate in the opening 139 at right angles to the plane of rotation of rollers 142. The roller 144 laterally guides the lift-section B when said section moves along section A.

As shown in Fig. 40, the top of the forward flange and the web adjacent thereto on each of the side members 122 is cut away, as at 148; said web being provided with laterally spaced openings 149 and 150. The axles of a pair of rollers 152 are secured to a horizontal ear 151 that is integrated with the interior face of said web. Said rollers are in parallelism and are equidistant from the vertical plane of the cut 148 to engage the rearward inwardly extending flange of member 155 for longitudinally guiding section C as it moves along section B. The axle of a roller 154 received in opening 149 is secured to a vertical ear 153 which is also integrated with the interior face of said web and spaced below said horizontal ear 151. The roller 154 is normal to the plane of the axes of rollers 152 and laterally guides the lift-section C when said section is moved upon section B.

As shown in Fig. 15, the third elevator lift-section C is comprised of side members 155 each having a Z-shaped cross-section. Said members are secured in a spaced order with their webs in an opposed relationship at a predetermined distance slightly greater than the distance between the planes of the outboard edges of the side members 122 of section B. An upper strut 156, bottom strut 157, intermediate struts 158, and diagonal ties 160 support the side members 155 in their spaced relationship. All of the struts and supporting rods are secured at their junctions, and to the side members 155, as by welding.

As shown in Fig. 37, the bottom of each of the side members 155 is cut away, as at 168, and is provided with laterally spaced openings 169 and 170. The axles of a pair of rollers 172 are secured to a horizontal ear 171 on the exterior web face of each of the side members 155. Said rollers are positioned in parallelism and are equidistant from the vertical plane of the cut 168 to engage the forward outwardly extending flange of member 122 for longitudinally guiding section C as it moves along section B. The axle of a roller 174 is received in a vertical ear 173 on said web allowing the roller 174 to rotate in the opening 169 and laterally guide section C when said section is moved along section B.

As shown in Figs. 18, 19, and 43, the fourth elevator section D is an operator-supporting platform. Said section is comprised of a pair of triangularly shaped bracket members 178 secured in a spaced relationship slightly greater than the overall width of the lift-section C and extending forwardly of said section. The brackets 178 are secured in position by a laterally extending cross member 179. Support for the floor section 177 of the platform is provided by a brace 176 extending between the tops of the two brackets 178, as shown in Fig. 20. Two pairs of rollers 180 and 181 fitted with suitable axles are secured to the inner faces of the supporting brackets 178 and engage the forward outwardly extending flange of member 155 to longitudinally guide section D along section C. Said rollers are positioned such that both pairs of rollers are in vertical alignment with the plane of their axles normal to the brackets 178. Another set of rollers 184 and 185 fitted with suitable axles is secured to the outer faces of said brackets 178. The rollers 184 and 185 are positioned adjacent to, and at right angles to, the rollers 180 and 181 respectively. Rollers 184 and 185 laterally guide section D as it moves along section C.

It is to be understood that while the roller and guiding mechanisms for each elevator section have been described for one leg of each section, the opposite legs are provided with like structures. The rollers used throughout the apparatus are of similar construction. As shown in Fig. 21, each of the rollers is of a conventional anti-friction type, wherein the roller is retained on an axle. The shank of each axle is of sufficient length to extend through the web of the side members of the several elevator sections, and is threaded on the end opposite the roller to receive a suitable securing nut for holding said roller and axle in a fixed position with respect to said side members.

I have minimized the bulk without sacrificing the strength of the side members of the elevator sections by cutting circular openings 111 in said members, as shown in section A of Fig. 11. All of the several component structures described lend themselves to economy of material and to the processing and handling thereof.

In coordinating the several elevator sections, section A is disposed with its sill strut 103 upon the top faces of the members 87 at the rearward portion of the truck chassis. Said strut may be secured thereto by any means commonly employed by those skilled in the art, such as welding and the like. As shown in Figs. 24 and 25, the upper portions of the side members 101 are connected by suitable braces 190 to the adjacent portions of the side walls of the truck body, said frame thereby being anchored in a fixed vertical position.

When lift-section B is lowered, with its rearward face moving along the forward face of lift-section A, its rollers 142 engage the opposite faces of the marginal portions of section A; while the rollers 144 engage the edges of said marginal portions of section A to guide section B along section A. At its lowered position section B rests with its sill strut 124 upon the top face of the chassis members 87.

When the lift-section C is lowered, with its rearward face moving along the forward face of lift-section B, its rollers 172 engage the opposite faces of the marginal portions of section B; while the rollers 174 engage the edges of said marginal portions of section B guiding the movement of section C along section B. Lift-section C is engaged by the rollers 152 and 154 which also guide said section as it moves along the forward face of lift-section B. At its lowered position said section rests with its sill strut 157 upon the top faces of the chassis members 87.

When the platform section D is lowered with its rearward face moving along the forward face of lift-section C, its rollers 180 and 181 engage opposite faces of the marginal portions of section C; while the rollers 184 and 185 engage the edges of said marginal portions guiding the movement of section D along section C. In its lowermost position the platform section D lies immediately forward of the elevator assembly substantially level with the truck floor 55.

The various elevator lift-sections are raised and lowered one upon the other by means of a series of cables and link-chains interconnecting said sections. Cables 193, each running from a drum 96 of the winch, are trained over the pulleys 108 and the ends of said cables are then directed downwardly through the sleeves 134 on section B. Said sleeves are received in a suitable bracket 132 secured to the frame members 122. The tension on each cable may be adjusted by adjusting each sleeve; said sleeves then being secured in a fixed position by the lock nut 135, as shown in Fig. 22.

The chains 196, each with an end thereof connected to a hitch lug 110 secured to frame members 101 of section A, are trained over the sprockets 128 of section B. The opposite ends of each of the chains are secured to the eye bolts 165 having lock nuts 166 and secured in a bracket 163 on section B, as indicated in Figs. 27 and 37. In a similar manner the chains 198, each with an end thereof connected to the hitch lugs 131 secured to frame members 122 of section B, are trained over sprockets 161 of section C. The opposite ends of said chains are secured to eye bolts 187 and complementing lock nuts 188 on the cross member 179 of section D.

In this typical embodiment of my invention having three movable sections, when power is applied to the winch mechanism the cable 193 is retracted over the sheave 108 raising the bottom of lift-section B to the top of section A. This raising of lift-section B causes the chain 196 attached to section A to move downwardly over sprocket 128 thereby raising the bottom of lift-section C to the top of lift-section B. As section C raises, chain 198 moves downwardly over sprocket 161 raising the platform section D to the top of lift-section C. Thus, both lift-sections and the platform section move upward concurrently. Similarly, to lower the elevator and the platform, the winch mechanism reverses its direction of operation to unwind the cable 193 and allow the lift-sections B and C and the platform section D to lower into the truck body by means of gravitational pull upon said movable sections. This lifting movement causes the platform section D to raise from its position level with the floor 55 of the truck body to a height of about 20 feet above said floor, as indicated by the broken lines in Figs. 3 and 4. The section A is dependently maintained in its fixed position with respect to the truck, while the remaining lift-sections are free to move upwardly of section A. All of the lift-sections are so coordinated such that the elevated structure formed will sustain the platform mounted thereon with steadiness and dependability under all conditions of use. The steadiness and rigidity of said structure will adapt said elevator assembly for the accommodation and use of any type of cantilever or projector type of platform that may be desired.

The elevator assembly is preferably power-operated. The drawings show one convenient way of obtaining this power operation; which is by taking off from the main truck-driving power line that leads from the truck-driving engine to the truck-driving wheels, conveniently at the transmission of that main power line, a branch power line to provide power for the elevator assembly. That branch power line extends through suitable power-transmitting and control mechanisms to the mechanism which directly operates the elevator assembly—an elevator-operating mechanism shown in the drawings as a winch.

As shown in Figs. 49 and 50, the power for driving the winch for the elevator assembly is taken from the truck engine. A reversible power take-off device 218 is attached to the transmission element T of the truck power plant. A pair of shafts 219 and 220 interconnected by universal joints are connected to the drive shaft 98 of said winch. A control lever 221 fulcrumed on a block 222 is secured to the underside of the truck floor 55. Said lever 221 has its weight arm 223 interconnected by a link 224 to the shift arm S of the power take-off. When the lever 221 is in the upright, or neutral position, the power take-off is out of gear, but when the lever 221 is moved out of the neutral position the power take-off is put into gear for driving the winch. Moving the lever rearwardly in the direction of the arrow H actuates the winch to reel in the cable 193 and move the elevator lift-sections and elevator platform upwardly; and when the lever is moved forwardly in the direction of the arrow L, the winch is actuated to unwind the cable 193 and the elevator lift-sections and the elevator platform move downwardly. A rod 225 connected to the weight arm 223 of the lever 221 extends rearwardly and is connected to a crank 226. The crank 226 is secured to a cross-shaft 227 that has its lateral ends journaled in fittings secured at the inner faces of the chassis members K. Secured to said cross-shaft 227 is a crank 228 journaled to a connecting arm 238, which controls an elevator assembly actuating lever.

Said elevator actuating lever is comprised of a weight arm 233 of a predetermined length having a plurality of spaced holes 234. The lever is fulcrumed about a pin 231 inserted through a supporting block 232; said block being secured on cross member 92 of the winch frame. The power arm 235 on said lever has a downwardly directed lug 236 located a short distance forwardly from the fulcrum pin 231 and connected to the arm 238. The power arm is urged downwardly by means of a load 237 which extends vertically downward from the forward end of said power arm. A vertical rod 240 with its upper portion received in an eyelet 112 extending forwardly from the strut 102 on section A is pivotally joined at its lower end to one of the holes 234 of the weight arm 233. The load 237 counterbalances the weight of said vertical rod 240 to hold the system in equilibrium. As shown in Fig. 50, a collar 241 is positioned near the upper end of the vertical rod 240. Another collar 242 is positioned at a predetermined location near the lower end of said vertical rod. The free end of an arm 130 projecting rearwardly from section B at its lower end is in close proximity to the vertical rod and above the collar 242. The relative positions of these parts when the elevator platform is at its lowermost position is shown in Figs. 48 and 50.

As section B of the elevator rises to reach the predetermined limit of its upward travel, the arm 130 on said frame impinges against the underside of the collar 241 and raises the vertical rod 240. With the pressure on the arm 233 thereby being released, the load arm 237 lowers, causing the connecting rod 238 to actuate the cranks 226 and 228. Said cranks communicate said movement to the connecting rod 225 to return the power take-off lever 221 to a neutral position, thereby taking the power take-off out of gear and arresting the elevation of the elevator. At this phase of the operation the platform is stably supported and held in its upward position by the series of cables and chains interconnecting the winch and the movable elevator section. The service operator on the elevator platform may signal the truck driver through the transparent glass in the truck roof to hold such a position, or to move the platform to a new desired elevation.

To lower the platform, the operator within the truck body moves the lever 221 in the direction of the arrow L whereupon the power take-off is moved into gear and the elevator is set into a downward motion by means of the winch mechanism which unwinds the cable 193 thereby permitting lift-sections B and C and the platform section D to descend by gravitational pull. As elevator section B reaches the predetermined limit of its downward travel, the arm 130 impinges against the top of the collar 242 thereby lowering the vertical rod 240. Said limit of travel is determined by the setting of the collar 242 on the vertical rod 240. The impinging of the rod 240 against arm 233 causes the lever 221 to be returned to its neutral position thereby taking the power take-off out of gear and arresting the motion of the elevator. Thus while the lever 221 is poised at all times at one or the other side of a neutral position while the elevator is moving; it is at all times operable by the operator while the elevator is moving. Further, said lever is ordinarily returned to neutral position at the completion of each upward or downward travel of the elevator platform.

Conveniently, the apparatus may be provided with a safety system to cause the brakes of the truck to be set and maintained in a set position while the platform is being raised, lowered, or is in an elevated position. As shown in Fig. 51, an extension 247 is provided at the end of the weight arm of the brake foot lever P. A flexible connecting cable 248 extends between the extension arm 247 and the short arm 244 of a bell crank pivotally mounted on a truck frame member 243. Said crank has an elongated arm 246 and a short arm 244 which is provided with a plurality of aligned holes 245. The short arm 244 is biased rearwardly by means of a spring 249 communicating between said arm and a suitable bracket 250 fixed to the underside of the truck chassis. The spring 249 causes the cable 248 to be pulled rearwardly moving the weight arm of lever P rearwardly and holding it in such a braking position. The oil pressure in the hydraulic cylinder O acts to brake the wheels of the truck; said wheels being held braked at all times during the operating of the elevator. When the platform reaches its lowermost position, the cross member 179 on said platform impinges against and depresses the bell crank arm 246, whereupon the short arm 244 swings forwardly releasing the tension on the cable 248 thereby releasing the pressure on the brake foot lever P and the oil cylinder O. The pressure on the oil cylinder O being released, the brakes upon the truck are relaxed and the truck is free to move.

In providing the elevator structure described, I have made possible different advantages, and the availability of several facilities needed for the servicing of overhead utility equipment. As shown in Figs. 23 and 24, a floor-level work area is comprised of a plurality of tubs 201, 202, and 203 positioned within the truck body at a location adjacent to the plane of vertical travel of the elevator platform. These tubs are plumbed and are adapted to receive and hold water for the necessary floor-level laundry service operations. Suitable discharge pipes 204 are located at the bottom of each of the tubs to provide a means of drainage. The washing and rinsing transactions incident to the handling and re-handling of glassware and the like may be performed (in these tubs) by the operator while he is standing upon the elevator platform.

An elongated open-top drier box 205 is supported at a suitable height above said tubs. The box 205 is provided with a floor 206 extending the length of said box and inclined downwardly to one end of said box. A discharge pipe 207 at the lower end of the floor 206 empties the discharge water from said box into an adjacent tub. An air space 212 commensurate with the bottom of the box 205 is positioned immediately beneath the floor 206 and communicates with the drier box 205 by means of a plurality of vertical vent pipes 208 extending upwardly through the floor 206. The air space 212 is supplied with a substantial amount of fresh air by means of an air intake duct 209 positioned immediately underneath the truck floor 55. The air is conducted from the duct 209 through a suitable connecting pipe 211 to the air space 212. Desirably, the intake duct 209 is positioned close to the power plant of the truck to receive warm air emanating from said power plant. A sufficient amount of air is taken into said system to create an air flow into the drier box 205 effective for expediting the drying of globes that have been disposed above the vent pipes 208. The excess water within the box is drained off through the discharge pipe 207.

As shown in Figs. 23 and 24, racks 214 and 215 are positioned along the side walls of the truck body at a suitable height. Said racks facilitate the handling of glassware and the like by the truck driver or the service operator. A receptacle 216 is also provided for discarded and broken glassware.

In using my apparatus only two operators are required. One operator serves as a truck driver and the other performs floor-level and overhead duties from the service platform on the elevator assembly. The operator on the platform handles all of the overhead work, such as removing dirty street light glassware, replacing it with clean glassware, replacing broken glassware, and the like. While the driver is moving the truck to a new location the service operator washes dirty glassware in the laundry equipment in the truck so that it will be clean and ready to replace the dirty glassware which will be removed at the next overhead light, which in turn will be washed during the next subsequent move. All of the equipment has been arranged on the trucks so that the service operator need never leave the elevator platform for either his overhead or floor-level work operations.

The truck driver in addition to driving the truck operates the elevator raising and lowering controls to elevate the service operator to the desired elevation for performing his various duties. The driver is also available to assist in the floor-level glassware washing operation when the service-man is at his elevated station. This sequence of operations and combination of service personnel facilitates the overhead service operations which have been heretofore highly inefficient.

What I claim as my invention is:

1. Apparatus for servicing over-head equipment, comprising a truck having a body enclosing a floored work area, elevator mechanism including a plurality of telescopically movable upright elevator sections disposed transversely within the body in face-to-face relationship adjacent the rear wall thereof, and below the roof level thereof, a platform carried by the forward-most section and having a lowered position substantially at the floor level of the body and immediately adjacent said work area, the rearmost section being fixed to said truck and the other sections and platform being movable with respect to each other and to said fixed section, to elevate said platform with respect to the forward-most section and to an elevated position of access to over-head equipment, whereby a service man stationed on said platform may be transported directly between a position within said body substantially at the floor level thereof and a position to service over-head equipment.

2. Apparatus as defined in claim 1 in which said body encloses a truck-operator's station in open access to said work area.

3. Apparatus as defined in claim 2, in which said truck is provided with brakes, and with the addition of automatic means to set the brakes of the truck upon movement of the platform from lowered position.

4. Apparatus as defined in claim 1, in which said body has a fixed roof section over said work area and a movable roof section over the elevator and platform area of the body.

5. Apparatus as defined in claim 1, with the addition of service equipment positioned in said work area immediately adjacent the lowered position of the platform and accessible for use directly by a service man on said platform.

6. Apparatus for servicing over-head equipment, comprising a truck having a floored work-area, an elevator assembly carried by the truck adjacent an edge of its bed area and including an upright elevator section fixed on the truck and a plurality of lift sections each supported at and movable along that face of the next lower section which faces the truck work-area and each having means to support a next higher elevator portion for movement along its opposite face, a platform support carried by and movable along the top section, said sections in lowered position being disposed substantially in face-to-face and fully overlapping relationship and said platform support being carried by said top section substantially at the bottom of the elevator assembly, a platform on said platform support between said elevator assembly and said floored work-area and disposed in lowered position substantially at the floor level of said work-area, and means to lift and lower said platform support and lift sections with respect to their supporting sections between said lowered position and an elevated position in which said platform lies at the top of the extended sections, whereby a workman on said platform may move directly between a lowered position of direct access to said work area and an elevated position of direct access to over-head equipment.

7. Apparatus for servicing over-head equipment as defined in claim 6, in which the elevator sections are roller mounted on each other with each section comprising a longitudinal rail supported and guided for longitudinal movement by rollers carried by an adjacent section, and in which the elevator part next above each movable section is connected by a flexible tension member to the section next below the movable section, and the movable section carries a sheave or the like upwardly engaged with the tension member, the upward movement of each movable section acting through its sheave to lift the next higher elevator part with respect to the next lower section, and power means for lifting the first movable section with respect to the fixed section.

8. Apparatus for servicing overhead equipment, comprising a truck having a floor-level work area, an extendable and collapsible elevator assembly carried by the truck adjacent an edge of its bed area, a platform carried by the elevator assembly and disposed in lowered position in worker-supporting position substantially at the bottom of the collapsed elevator assembly at the floor level of said work area and adjacent thereto in open access relation with such work area, said elevator assembly being constructed and arranged to lift the platform in worker-supporting position from said lowered position upward with respect to the elevator assembly and the truck to an elevated position in which the platform lies at the top of the extended elevator assembly, whereby a workman on said platform may move directly between a position of direct access to service equipment at said work area and an elevated position of direct access to overhead equipment.

9. Apparatus for servicing over-head equipment, comprising a truck having a floor-level work area, an elevator assembly carried by the truck adjacent an edge of its bed area and including an upright elevator section fixed on the truck and a plurality of lift sections each supported by and movable with respect to the next lower section, a platform support carried by and movable along the top section, said sections in lowered position being disposed in collapsed relation below a limited height to clear overhead obstructions along a roadway over which the truck may be moved and said platform being carried by said top section substantially at the bottom of the elevator assembly, a platform on said platform support between said elevator assembly and said work area and disposed in lowered position substantially at the floor level of said work area, and means to lift and lower said platform support and lift sections with respect to their supporting sections between said lowered position and an elevated position in which the platform lies at the top of the extended sections, whereby a workman on said platform may move directly between a position of direct access to said work area and an elevated position of direct access to overhead equipment.

10. Apparatus as defined in claim 9, in which said elevator assembly is carried at the rear of the truck with the platform in front of the elevator assembly and the work area extends forward from the platform position to a driver's position and is openly accessible to the driver.

11. Apparatus as defined in claim 9, in which the section or platform next above each movable section is connected by a flexible tension member to the section next below the movable section, and the movable section carries operating means upwardly engaged with the tension member, the upward movement of each movable section acting through its engaged tension member to lift the next upper section or platform with respect to the next lower section.

References Cited in the file of this patent

UNITED STATES PATENTS

| 470,112 | Ehrentraut | Mar. 1, 1892 |
| 1,229,746 | Hale | June 12, 1917 |
| 1,319,943 | Bessolo | Oct. 28, 1919 |
| 1,426,276 | Christie | Aug. 15, 1922 |
| 1,582,793 | Smith et al. | Apr. 27, 1926 |
| 1,925,353 | Wachowitz | Sept. 5, 1933 |
| 1,960,355 | Tamini | May 29, 1934 |
| 1,961,513 | Gill | June 5, 1935 |
| 2,159,022 | Hawkins | May 23, 1939 |
| 2,175,381 | Dow | Oct. 10, 1939 |
| 2,204,671 | Erickson et al. | June 18, 1940 |
| 2,464,039 | Howell | Mar. 8, 1949 |
| 2,482,211 | Reichardt | Sept. 20, 1949 |

FOREIGN PATENTS

| 879,051 | France | of 1942 |